(12) United States Patent
Park et al.

(10) Patent No.: US 11,084,533 B2
(45) Date of Patent: Aug. 10, 2021

(54) VEHICLE BODY STRUCTURE OF VEHICLE

(71) Applicants: HYUNDAI MOTOR COMPANY, Seoul (KR); KIA MOTORS CORPORATION, Seoul (KR)

(72) Inventors: Hyunwook Park, Daegu (KR); SeungMin Jeong, Hwaseong-si (KR)

(73) Assignees: HYUNDAI MOTOR COMPANY, Seoul (KR); KIA MOTORS CORPORAITON, Seoul (KR)

( * ) Notice: Subject to any disclaimer, the term of this patent is extended or adjusted under 35 U.S.C. 154(b) by 88 days.

(21) Appl. No.: 16/562,608

(22) Filed: Sep. 6, 2019

(65) Prior Publication Data

US 2020/0164922 A1 May 28, 2020

(30) Foreign Application Priority Data

Nov. 23, 2018 (KR) .................. KR10-2018-0146583

(51) Int. Cl.
 *B62D 21/15* (2006.01)
 *B62D 25/08* (2006.01)
 (Continued)

(52) U.S. Cl.
 CPC .......... *B62D 21/155* (2013.01); *B62D 25/02* (2013.01); *B62D 25/082* (2013.01); *B62D 25/16* (2013.01);
 (Continued)

(58) Field of Classification Search
 CPC ............... B62D 21/155; B62D 25/082; B62D 25/2018; B62D 27/023; B62D 25/2036;
 (Continued)

(56) References Cited

U.S. PATENT DOCUMENTS 8,894,129 B2 * 11/2014 Katou .................. B62D 21/152
 296/187.03
9,630,578 B1 * 4/2017 Nusier ................... B60R 19/16
 (Continued)

FOREIGN PATENT DOCUMENTS

JP 2007-185983 A 7/2007
JP 2008-195204 A 8/2008
 (Continued)

*Primary Examiner* — Pinel E Romain
(74) *Attorney, Agent, or Firm* — Brinks Gilson & Lione (57) ABSTRACT

A vehicle body structure may include: front side members extended in a longitudinal direction of the vehicle and provided at opposite sides of the vehicle body structure; a sub-frame that includes: a front cross member and a rear cross member, which are spaced apart from each other, and front side structures extending forward from opposite sides of the sub-frame, where the sub-frame is coupled to the front side members at opposite sides; fender apron members to connect the front side structures to A-pillars of the vehicle body structure; load distribution members coupled to the fender apron members to transmit a load to the fender apron members and to the front side members; and a cross bar extending in the transverse direction while being spaced (Continued)

apart from an upper side of the front cross member of the sub-frame, and having opposite ends coupled to the front side members.

3 Claims, 12 Drawing Sheets

(51) Int. Cl.
  *B62D 25/20* (2006.01)
  *B62D 27/02* (2006.01)
  *B62D 25/16* (2006.01)
  *B62D 25/02* (2006.01)
(52) U.S. Cl.
  CPC ..... *B62D 25/2018* (2013.01); *B62D 25/2036* (2013.01); *B62D 27/023* (2013.01)
(58) Field of Classification Search
  CPC ...... B62D 25/16; B62D 25/02; B62D 21/152; B62D 21/11; B62D 25/08; B62D 25/04; B62D 25/00
  USPC ....................................... 296/187.1
  See application file for complete search history.

(56) References Cited

U.S. PATENT DOCUMENTS

| | | | |
|---|---|---|---|
| 10,086,881 B2 * | 10/2018 | Kim | B62D 25/08 |
| 2005/0077711 A1 | 4/2005 | Yasui et al. | |
| 2007/0252412 A1 * | 11/2007 | Yatsuda | B62D 25/082 |
| | | | 296/193.09 |
| 2008/0224502 A1 | 9/2008 | Miki | |
| 2015/0054312 A1 * | 2/2015 | Hisazumi | B62D 25/082 |
| | | | 296/193.09 |
| 2017/0174265 A1 * | 6/2017 | Maruyama | B62D 21/03 |
| 2018/0370569 A1 * | 12/2018 | Madasamy | B60R 19/24 |
| 2019/0016389 A1 * | 1/2019 | Kamei | B62D 21/152 |
| 2019/0118863 A1 * | 4/2019 | Hara | B62D 21/06 |
| 2019/0225279 A1 * | 7/2019 | Matsuoka | B62D 21/15 |
| 2020/0079431 A1 * | 3/2020 | Stainer | B62D 21/155 |
| 2020/0207418 A1 * | 7/2020 | Takakuwa | B62D 27/02 |

FOREIGN PATENT DOCUMENTS

| | | |
|---|---|---|
| KR | 10-2013-0061317 A | 6/2013 |
| KR | 10-2015-0050886 A | 5/2015 |

* cited by examiner

VEHICLE BODY STRUCTURE OF VEHICLE

CROSS-REFERENCE TO RELATED APPLICATION

This application claims priority to and the benefit of Korean Patent Application No. 10-2018-0146583, filed on Nov. 23, 2018, the entire contents of which are incorporated herein by reference.

FIELD

The present disclosure relates to a vehicle body structure of a vehicle capable of reducing injury of passengers and damage to a vehicle body.

BACKGROUND

The statements in this section merely provide background information related to the present disclosure and may not constitute prior art.

A vehicle collision causes injuries or death of vehicle passengers, so it is important to increase the safety against the impact and reduce the damage to the vehicle body. In this regard, manufacturers have been developing various collision damage reduction technologies and conducted various crash tests to assess the collision safety of a vehicle.

For example, a crash test has been conducted via a moderate overlap frontal crash test, a side crash test, a roof strength test, and a head restraint and seat strength test, etc., and recently, Insurance Institute for Highway Safety (IIHS) has introduced a small overlap crash test, which is one of the crash conditions that may occur in the field. In the small overlap crash test, 25% of a front end of a driver's seat of a vehicle is brought into crash with a barrier, and the degree of deformation of the vehicle body and injury of passengers are assessed. The small overlap crash test is known as the most severe crash test.

In order to increase the safety in the small overlap crash, vehicle manufacturers have increased the strength of an A-pillar and a side seal periphery of the vehicle body.

However, we have discovered that such a vehicle body reinforcement method through reinforcing the A-pillar and the side seal periphery may cause rapid turning of the vehicle around a collision portion in the event of a small overlap crash, which may result in increased injury of neck and chest of the passenger. In addition, we have found that according to the reinforcement method, because only the side portion of the vehicle body adjacent to the passenger compartment is reinforced, there is a limitation in reducing damage to a power train room located in front of the passenger compartment.

SUMMARY

The present disclosure provides a vehicle body structure of a vehicle capable of reducing injury of passengers and damage to a vehicle body by allowing the vehicle to perform an avoidance behavior in a small overlap crash.

Additional aspects of the present disclosure will be set forth in part in the description which follows and, in part, will be obvious from the description, or may be learned by practice of the present disclosure.

In an aspect of the present disclosure, a vehicle body structure of a vehicle includes: front side members respectively extended in a longitudinal direction of the vehicle and provided at opposite sides of the vehicle body structure; a sub-frame that includes: a front cross member and a rear cross member, which are spaced apart from each other, and front side structures respectively extending forward from opposite sides of the sub-frame, wherein the sub-frame is coupled to the front side members at opposite sides thereof; fender apron members configured to connect the front side structures to A-pillars of the vehicle body structure; load distribution members coupled to the fender apron members and configured to transmit a load introduced in a transverse direction or the longitudinal direction of the vehicle upwards to the fender apron members and downwards to the front side members; and a cross bar extending in the transverse direction while being spaced apart from an upper side of the front cross member of the sub-frame, and having opposite ends thereof coupled to the front side members.

The vehicle body structure may further include: sub-frame mounting brackets coupled to lower sides of the front side members, to which opposite ends of the sub-frame are mounted; crossbar mounting brackets coupled to the front side members, to which the opposite ends of the crossbar are mounted; a fixing shaft fixed to the sub-frame and extended to an inner side of a corresponding front side member among the front side members passing through a corresponding sub-frame mounting bracket among the sub-frame mounting brackets and a lower side of the corresponding front side member; and a bulkhead installed at an inner side of the corresponding front side member in which the fixing shaft is located, to increase strength.

The bulkhead may be welded to the corresponding front side member and sub-frame mounting bracket, the fixing shaft, a corresponding cross bar mounting bracket among the cross bar mounting brackets, and a corresponding load distribution member among the load distribution members.

A load acting on a front end of the corresponding front side member and front side structure of the sub-frame in a small overlap crash may be distributed and transmitted to the corresponding front cross member, the cross bar, and the fender apron members by the bulkhead and the load distribution members.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, parts irrelevant to the description may be omitted for the clarity of explanation, and the size of each component shown in the drawings may be exaggerated or reduced for the sake of convenience in description.

Figure 1:
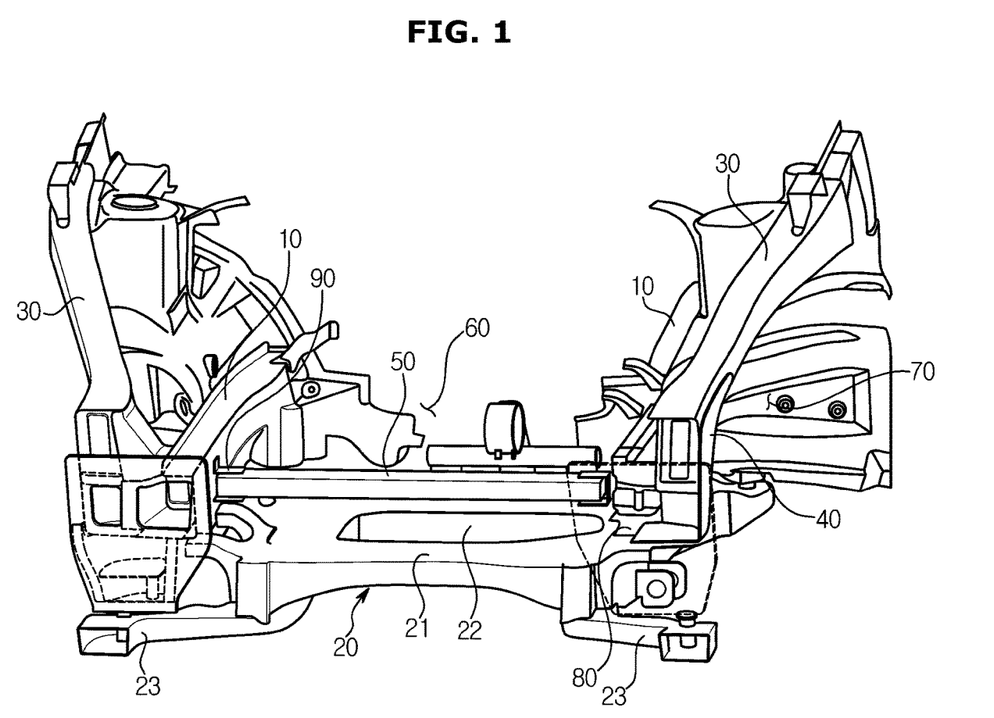
FIG. 1 is a perspective view illustrating a vehicle body structure according to one form of the present disclosure when viewed from the front.

Referring to FIG. 1, a vehicle body structure of a vehicle according to one form of the present disclosure includes: front side members 10, a sub-frame 20, fender apron members 30, load distribution members 40, and a cross bar 50.

The front side members are provided at opposite sides of the vehicle body structure and extended in a length direction (a longitudinal direction) of the vehicle. The sub-frame 20 is arranged at lower sides of the front side members 10 and is coupled to the front side members 10 at opposite sides thereof, respectively.

The sub-frame 20 is provided to increase strength in a transverse direction, and includes a front cross member 21 and a rear cross member 22 spaced apart from each other in a front and rear side direction. The sub-frame 20 forms a lower frame of a power train compartment 60 in which driving parts are installed. The sub-frame 20 includes front side structures 23 extending forward from opposite sides thereof.

Figure 2:
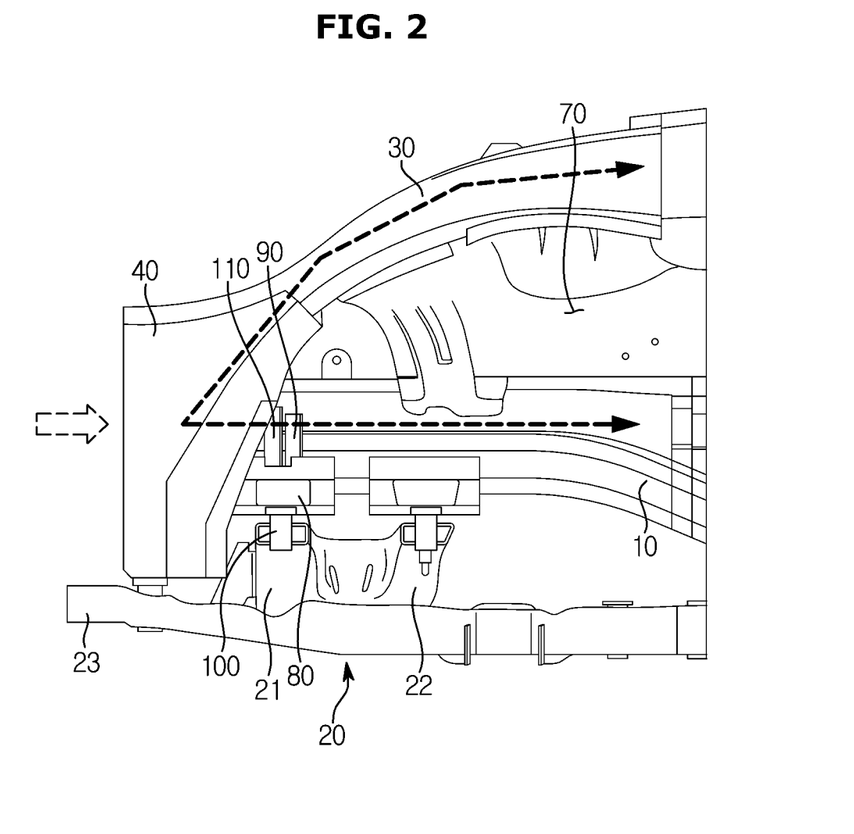
FIG. 2 is a view illustrating a load distribution member and a fender apron member of a vehicle body structure according to another form of the present disclosure.

Referring to FIG. 2, the fender apron members 30 connect front ends of the front side structures 23 to A-pillars located on sides of the vehicle, to thereby form a frame of side upper portions of the power train compartment 60 and an upper side of a wheel house 70.

Figure 3:
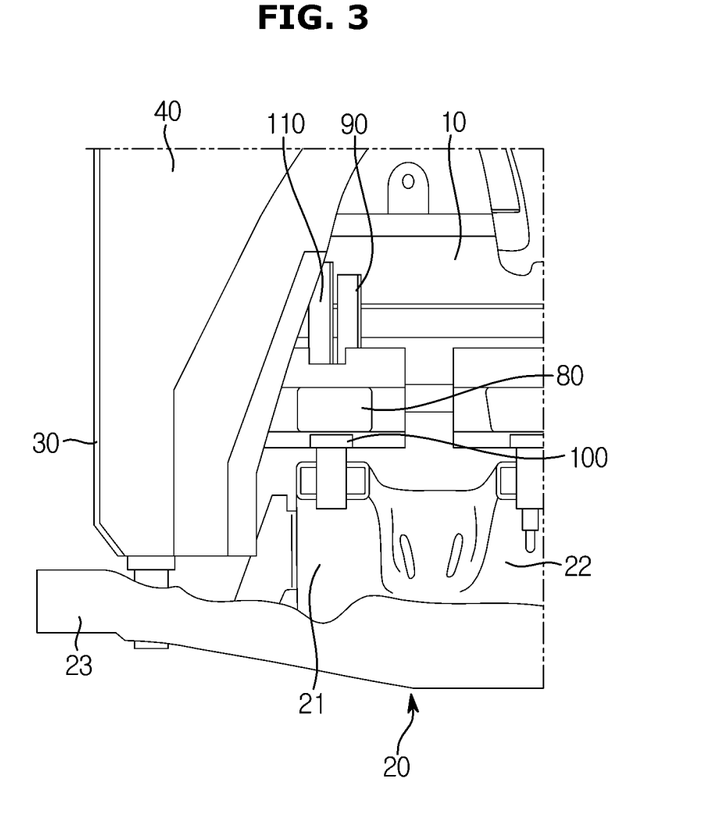
FIG. 3 is a view illustrating a coupling structure of a sub-frame front side structure, a fender apron member, and a load distribution member of a vehicle body structure according to one form of the present disclosure.
Figure 4:
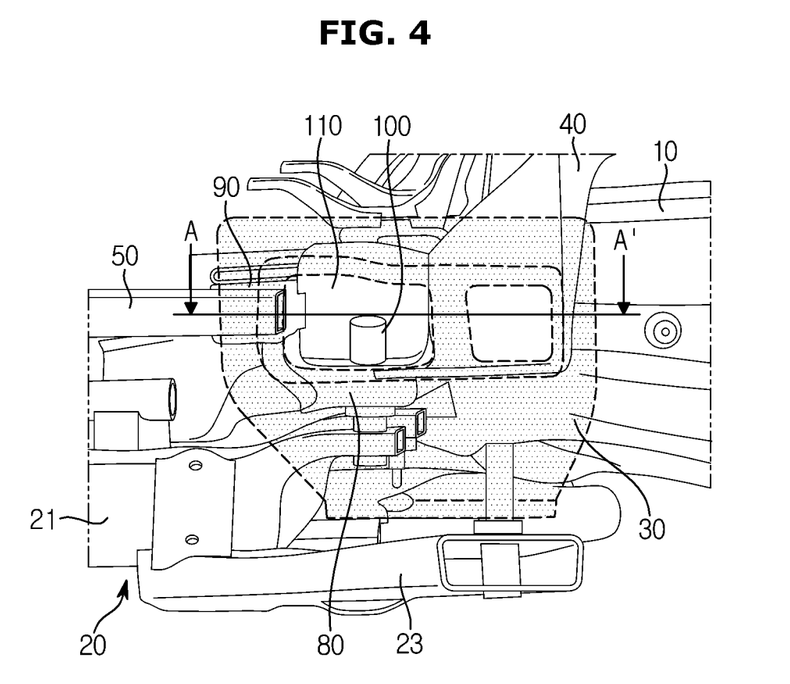
FIG. 4 is a perspective view illustrating a coupling structure of a bulkhead, a cross bar, a front side member, and a sub-frame of a vehicle body structure according to one form of the present disclosure.
Figure 5:
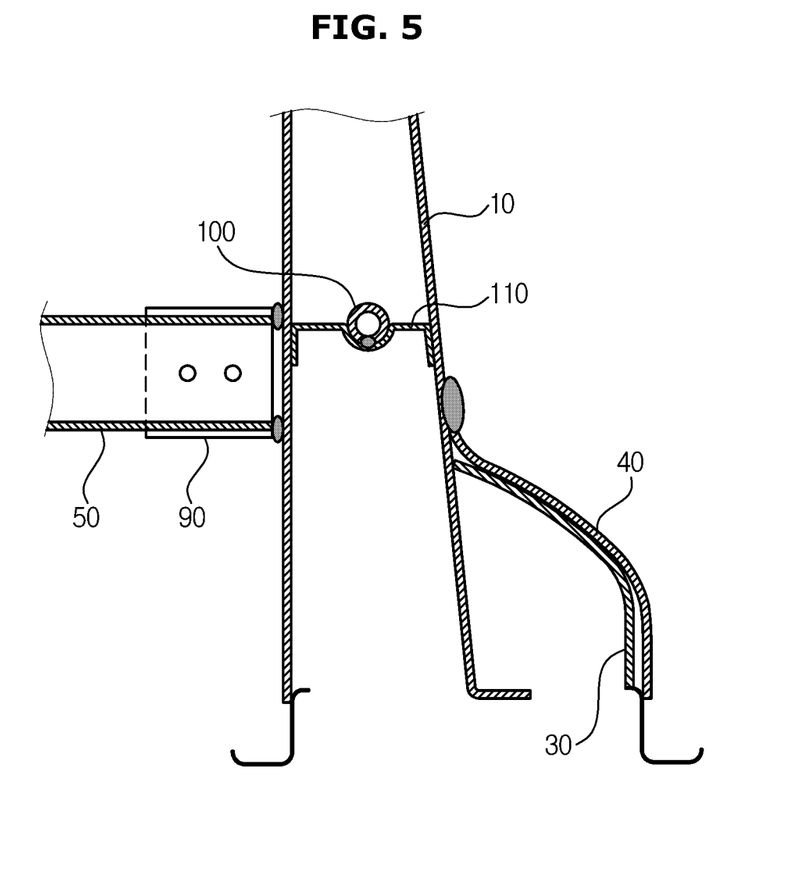
FIG. 5 is a cross-sectional view taken along line A-A' in FIG. 4.

Referring to FIGS. 2 and 3, the load distribution member 40 is coupled to a lower portion of the fender apron member 30 at a front side of the wheel house 70 to increase the strength of the fender apron member 30. The load distribution member 40 allows a load introduced in a transverse direction of the vehicle or the longitudinal direction to be distributed and transmitted upwards to the fender apron member 30 and downwards to the front side member 10.

The cross bar 50 extends in the transverse direction while being spaced apart from an upper side of the front cross member 21 of the sub-frame 20 and has opposite ends thereof coupled to the front side members, respectively, as shown in FIG. 1. The cross bar 50 may support a lateral load acting on the vehicle body structure together with the front cross member 21 of the sub-frame 20.

Referring to FIGS. 3 to 7, the vehicle body structure may include sub-frame mounting brackets 80, cross bar mounting brackets 90, a fixing shaft 100, and a bulkhead 110.

The sub-frame mounting brackets 80 are coupled to lower sides of the front side members, respectively, such that opposite ends of the sub-frame 20 are mounted to the front side members 10 as shown in FIGS. 4 to 7.

Figure 6:
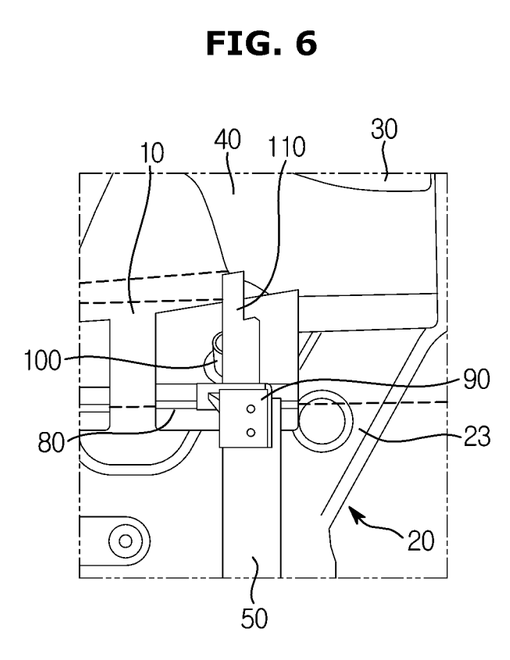
FIG. 6 is a view illustrating a mounting structure of a cross bar mounting bracket of a vehicle body structure according to one form of the present disclosure.

The cross bar mounting brackets 90 are coupled to the front side members such that the opposite ends of the cross bar 50 are mounted to the front side members 10 as shown in FIG. 6.

The fixing shaft 100 is fixed to the sub-frame 20 and extends upward to pass through the sub-frame mounting bracket 80 and a lower side of the front side member 10 and to an inner side of the front side member 10. Since the fixing shaft 100 is installed to pass through the sub frame mounting bracket 80 and the lower side of the front side member 10 such that the sub-frame 20 is firmly fixed to the front side member 10.

Figure 7:
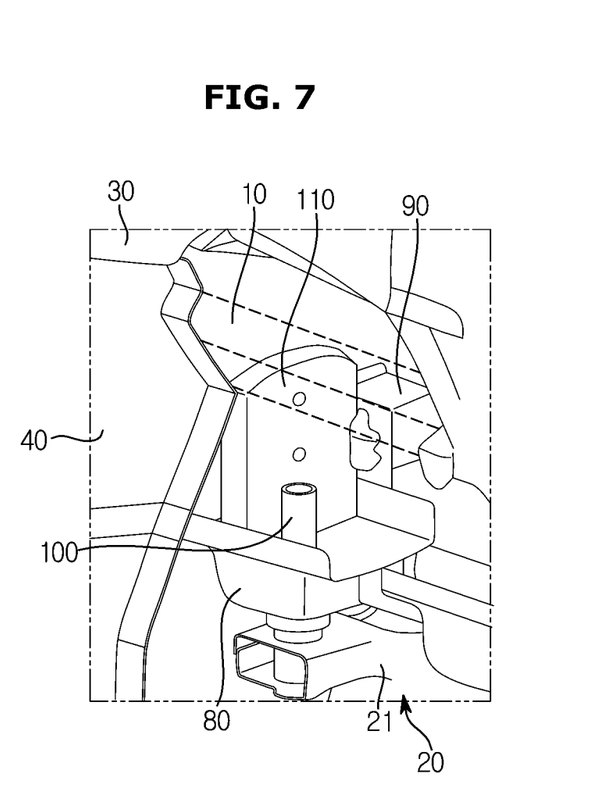
FIG. 7 is a perspective view illustrating a state of a bulkhead coupled to a peripheral structure of a vehicle body structure according to another form of the present disclosure.

Referring to FIG. 7, the bulkhead 110 is installed at an inner side of the front side member 10 in which the fixing shaft 100 is located, to thereby increase the strength of the front side member 10 at the corresponding position. The bulkhead 110 has a periphery thereof welded to one sides of the front side member 10, the sub-frame mounting bracket 80, the cross bar mounting bracket 90, and the load distribution member 40, and a center portion welded to the fixing shaft 100 as shown in FIGS. 3, 4, 5, 6, and 7.

The bulkhead 110 does not only increases the strength of the front side member 10 but also mediates connection between the front side member 10, the sub-frame mounting bracket 80, the fixing shaft 100, the cross bar mounting bracket 90, and the load distribution member 40.

Figure 8:
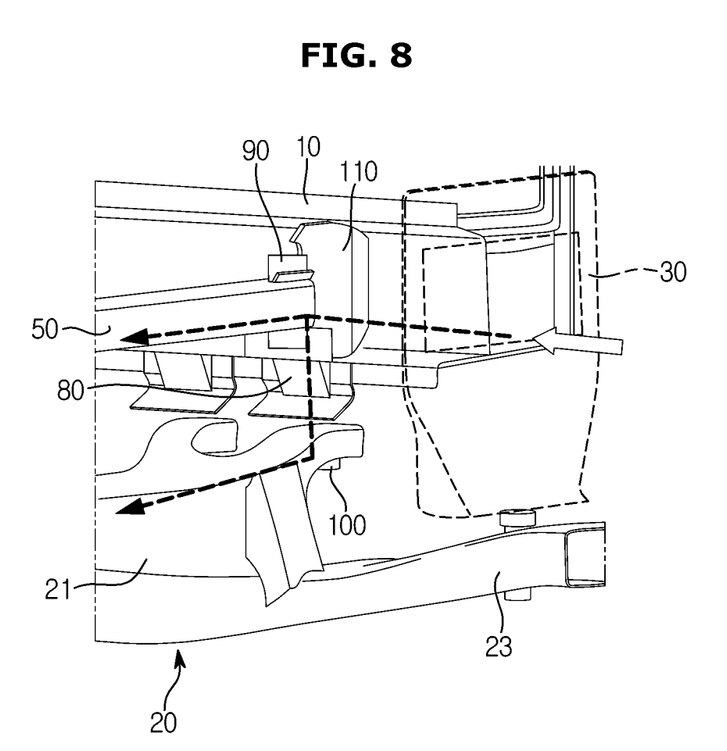
FIG. 8 is a view illustrating a state in which a load acting on a front end of a front side member of a vehicle body structure is distributed and transmitted from a bulkhead to a cross bar and a front cross member of a sub-frame.
Figure 9:
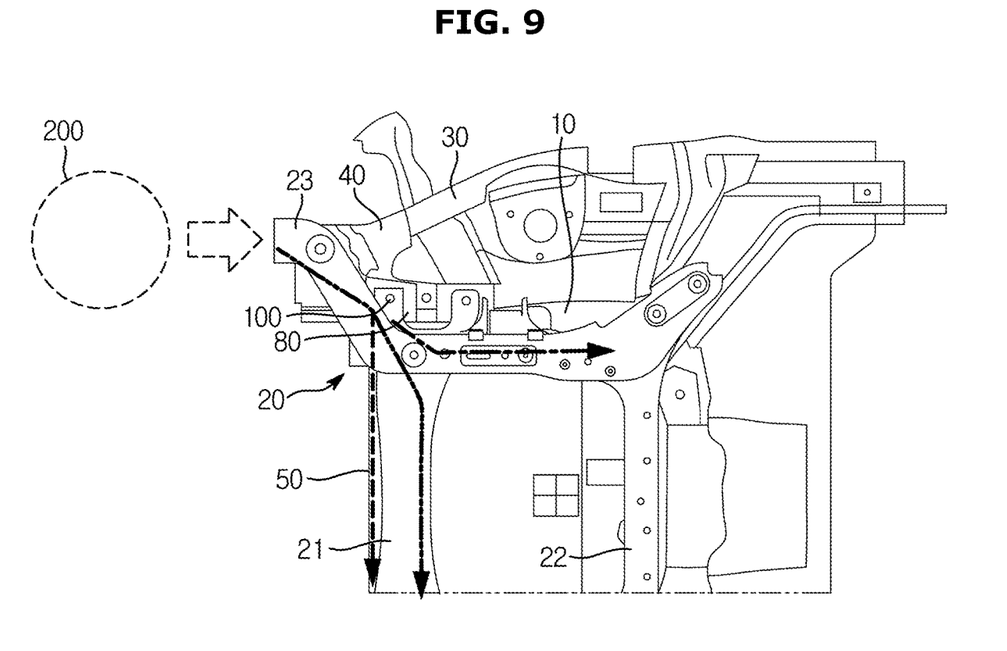
FIG. 9 is a bottom view illustrating a vehicle body structure, showing a state in which a load acting on a front side structure of a sub-frame is transmitted in a lateral direction through a cross bar and a front cross member of the sub-frame, and transmitted along a longitudinal direction through a front side member, in one form of the present disclosure.
Figure 10:
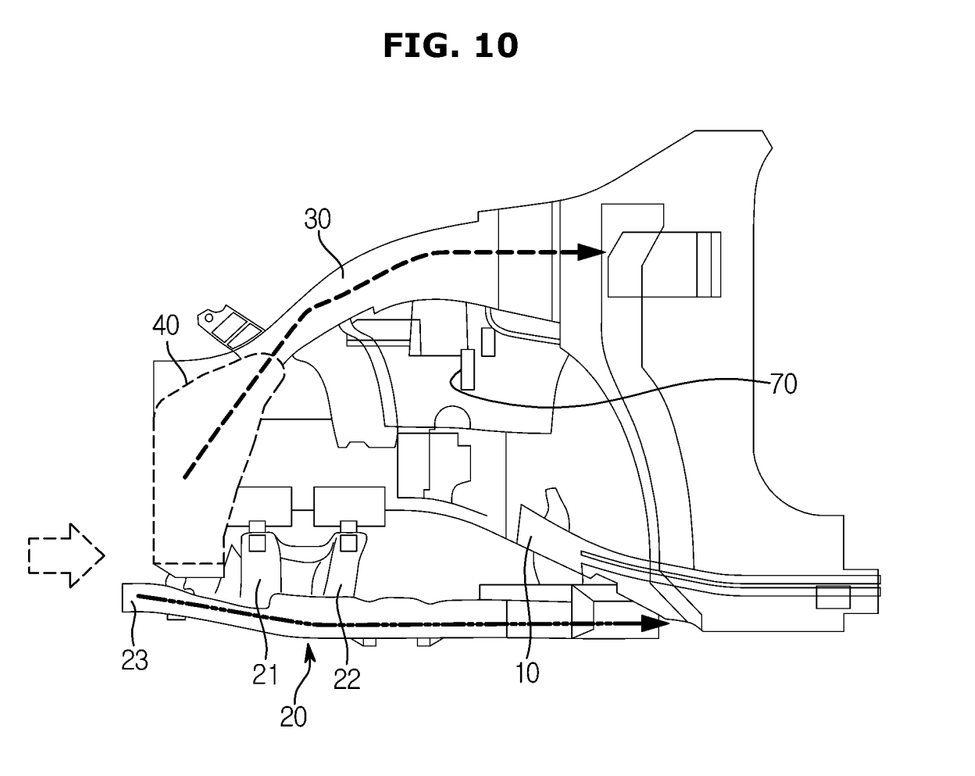
FIG. 10 is a side view of a vehicle body structure, illustrating a state in which a load acting on a front side structure of a sub-frame is transmitted in a longitudinal downward direction through the sub-frame and a front side member, and transmitted along a longitudinal upward direction through a fender apron member, in one form of the present disclosure.

Referring to FIGS. 8 to 10, the bulkhead 110 allows a load acting on the front end of the front side member 10 or the front side structure 23 of the sub-frame 20 in a small overlap crash to be distributed and transmitted to the front cross member 21, the cross bar 50, and the fender apron member 30.

In addition, the load distribution member 40 reinforces the lower side of the fender apron member 30 connected to the sub-frame 20, and by being connected to the bulkhead 110, allows a load (impact) introduced in a transverse direction or longitudinal direction of the vehicle body structure to be distributed and transmitted upwards to the fender apron member 30 and downwards through the sub-frame 20 to the front side member 10.

As described above, the vehicle body structure according to one form of the present form remarkably increases the strength with respect to longitudinal and transverse loads around the powertrain compartment 60 through the installation of the load distribution member 40, the bulkhead 110, and the cross bar 50, so that the devices (an engine, an electric motor, a transmission, etc.) installed in the powertrain compartment 60 are protected from the impact.

Figure 11:
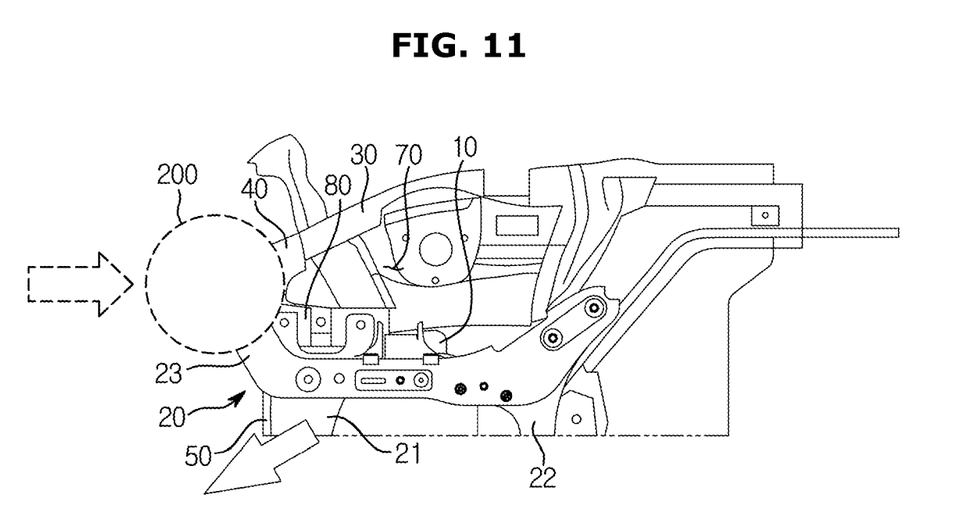
FIG. 11 is a bottom view of a vehicle body structure according to one form of the present invention, showing a state in which the vehicle body structure performs a behavior in a transverse direction to avoid a barrier at a time of a collision with the barrier in a small overlap crash test.
Figure 12:
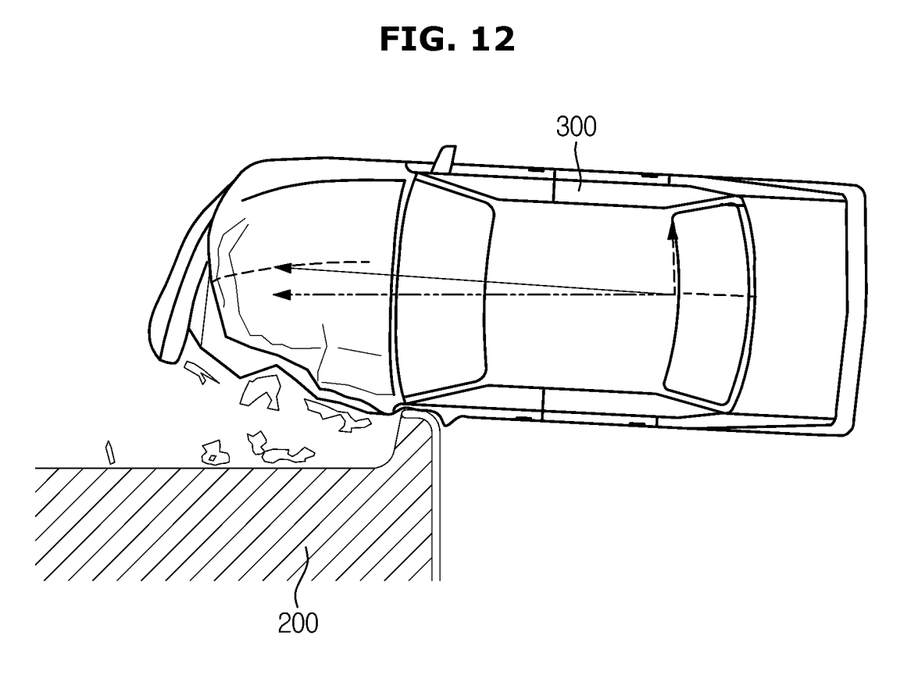
FIG. 12 is a plan view illustrating a vehicle collision tested with a vehicle body structure according to one form of the present disclosure, showing a state in which at a time of a collision with a barrier in a small overlap crash test, the vehicle moves forward without turning while being swept sideways.

In addition, the vehicle body structure according to one form of the present may reduce or minimize deformation of the front side member 10 in a small overlap crash by uniformly distributing loads into the front side member 10, the front cross member of the sub-frame 20, the cross bar 50, the fender apron member 30, and the like using the load distribution member 40 and the bulkhead 110. In addition, such a configuration allows the vehicle to be moved forward without turning while being swept sideways even at a time of collision with a barrier 200, so that passengers are protected from injury.

As is apparent from the above, the vehicle body structure of the vehicle according to the exemplary forms of the present disclosure can protect devices installed in a power train compartment in a small overlap crash by installing a load distribution member, a bulkhead, and a cross bar such that the strength with respect to longitudinal and transverse direction loads around the powertrain compartment is greatly increased.

The vehicle body structure of the vehicle according to the form of the present disclosure can reduce or minimize deformation of a front side member in a small overlap crash by allowing a load distribution member and a bulkhead to uniformly distribute a load between the front side member, a front cross member of a sub-frame, a cross bar, a fender apron member, and the like. In addition, the vehicle body structure of the vehicle according to the exemplary forms of the present disclosure can protect passengers from injury even in a collision with a barrier by allowing the vehicle to perform a behavior of avoiding the barrier such that the vehicle is moved forward without turning while being swept sideways.

What is claimed is:

1. A vehicle body structure of a vehicle defining a longitudinal direction and a transverse direction, the vehicle body comprising:
   front side members respectively extended in the longitudinal direction and provided at opposite sides of the vehicle body structure;
   a sub-frame including:
      a front cross member and a rear cross member, which are spaced apart from each other, and
      front side structures respectively extending forward from opposite sides of the sub-frame, wherein the sub-frame is coupled to the front side members at opposite sides thereof;
   fender apron members configured to connect the front side structures to A-pillars of the vehicle body structure;
   load distribution members coupled to the fender apron members and configured to transmit a load introduced in the transverse direction or the longitudinal direction upwards to the fender apron members and downwards to the front side members;
   a cross bar extending in the transverse direction while being spaced apart from an upper side of the front cross member of the sub-frame, and having opposite ends coupled to the front side members;
   sub-frame mounting brackets coupled to lower sides of the front side members, to which opposite ends of the sub-frame are mounted;
   crossbar mounting brackets coupled to the front side members, to which the opposite ends of the crossbar are mounted;
   a fixing shaft fixed to the sub-frame, and extended to an inner side of a corresponding front side member among the front side members passing through a corresponding sub-frame mounting bracket among the sub-frame mounting brackets and a lower side of the corresponding front side member; and
   a bulkhead installed at an inner side of the corresponding front side member in which the fixing shaft is located so as to increase strength.

2. The vehicle body structure of claim 1, wherein the bulkhead is welded to the corresponding front side member and sub-frame mounting bracket, the fixing shaft, a corresponding cross bar mounting bracket among the cross bar mounting brackets and a corresponding load distribution member among the load distribution members.

3. The vehicle body structure of claim 2, wherein a load acting on a front end of the corresponding front side member and front side structure of the sub-frame in a small overlap crash is distributed and transmitted to the corresponding front cross member, the cross bar, and the fender apron members by the bulkhead and the load distribution members.

* * * * *